(12) United States Patent
Park et al.

(10) Patent No.: US 8,698,996 B2
(45) Date of Patent: Apr. 15, 2014

(54) FLEXIBLE SUBSTRATE FOR DISPLAY DEVICE AND DISPLAY DEVICE USING THE SAME

(75) Inventors: Jong Jin Park, Yongin-si (KR); Mi Jeong Song, Suwon-si (KR); Kwang Hee Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 848 days.

(21) Appl. No.: 11/971,463

(22) Filed: Jan. 9, 2008

(65) Prior Publication Data

US 2008/0284971 A1 Nov. 20, 2008

(30) Foreign Application Priority Data

May 18, 2007 (KR) .................. 10-2007-0048660

(51) Int. Cl.
*G02F 1/1333* (2006.01)
*B32B 15/08* (2006.01)
*B32B 9/00* (2006.01)
*B32B 15/04* (2006.01)

(52) U.S. Cl.
USPC ......................... 349/158; 428/458; 428/469

(58) Field of Classification Search
USPC .......................................................... 349/158
See application file for complete search history.

(56) References Cited

U.S. PATENT DOCUMENTS

| | | | | |
|---|---|---|---|---|
| 4,103,102 A * | 7/1978 | Klein | | 174/254 |
| 4,241,132 A * | 12/1980 | Pratt et al. | | 442/376 |
| 5,262,227 A * | 11/1993 | Takabayashi et al. | | 428/215 |
| 5,266,385 A * | 11/1993 | Ishii et al. | | 428/209 |
| 7,022,266 B1 * | 4/2006 | Craig | | 252/512 |
| 2003/0005397 A1 * | 1/2003 | Larsen | | 716/6 |
| 2003/0020393 A1 * | 1/2003 | Tanaka et al. | | 313/483 |
| 2003/0090200 A1 * | 5/2003 | Topelberg et al. | | 313/511 |
| 2003/0187113 A1 * | 10/2003 | Shiho et al. | | 524/261 |
| 2004/0080459 A1 * | 4/2004 | Marx | | 343/703 |
| 2004/0151014 A1 * | 8/2004 | Speakman | | 365/49 |
| 2004/0218288 A1 * | 11/2004 | Pierson et al. | | 359/819 |
| 2004/0265554 A1 * | 12/2004 | Miyadera et al. | | 428/218 |
| 2005/0162606 A1 * | 7/2005 | Doane et al. | | 349/158 |
| 2005/0170198 A1 * | 8/2005 | Aida | | 428/626 |
| 2006/0066803 A1 * | 3/2006 | Aylward et al. | | 349/158 |
| 2006/0204772 A1 * | 9/2006 | Mukunoki et al. | | 428/480 |
| 2006/0226240 A1 * | 10/2006 | Singleton | | 235/492 |
| 2006/0251905 A1 * | 11/2006 | Arakawa | | 428/429 |
| 2007/0200220 A1 * | 8/2007 | Murai et al. | | 257/701 |
| 2007/0222370 A1 * | 9/2007 | Zhu et al. | | 313/504 |
| 2008/0026581 A1 * | 1/2008 | Tredwell et al. | | 438/691 |
| 2008/0213555 A1 * | 9/2008 | Ono et al. | | 428/215 |

FOREIGN PATENT DOCUMENTS

WO WO 2005064993 A1 * 7/2005 ............. H05B 33/00

* cited by examiner

*Primary Examiner* — Edward Glick
*Assistant Examiner* — Dennis Y Kim
(74) *Attorney, Agent, or Firm* — Cantor Colburn LLP

(57) ABSTRACT

The present disclosure relates to a flexible substrate for a display device including a plastic layer containing a woven glass fiber, a metal film coated on either both side surfaces or one surface of the plastic layer, and an overcoating layer formed on one surface of the metal film wherein the overcoating layer is on the side of the metal film opposite from the plastic layer, and to a display device using the flexible substrate. The flexible substrate is thin, and has small thermal expansion coefficient, excellent flexibility, heat resistance, gas permeability resistance and moisture blocking property. The flexible substrate can be used in various display devices such as a TV, a notebook computer, a cellular phone, or an electronic paper.

11 Claims, 2 Drawing Sheets

FLEXIBLE SUBSTRATE FOR DISPLAY DEVICE AND DISPLAY DEVICE USING THE SAME

CROSS REFERENCE TO RELATED APPLICATIONS

This non-provisional application claims priority under 35 U.S.C. §119 to Korean Patent Application No. 10-2007-0048660, filed on May 18, 2007 in the Korean Intellectual Property Office (KIPO), the entire contents of which are incorporated herein by reference.

BACKGROUND OF THE INVENTION

1. Field of the Invention

This disclosure relates to a flexible substrate for a display device, and a display device using the same. More particularly, the disclosure relates to a flexible substrate for display devices. The flexible substrate comprises a plastic layer that comprises a woven glass fiber, a metal film coated on either both side surfaces or one side surface of the plastic layer, and an overcoating layer formed on one side surface of the metal film, wherein the overcoating layer is on the side of the metal film opposite from the plastic layer. The flexible substrate is thin, and has a small thermal expansion coefficient, excellent flexibility, heat resistance, gas permeability resistance and also displays resistance of moisture.

2. Description of the Related Art

It is desirable for display devices such as a liquid crystal displays (LCD) and an organic electro luminescent displays (OLED) to display a high performance such as long-term reliability coupled with light weight. In addition, it is desirable for such display devices to permit a designer flexibility in design of such displays. Design flexibility includes freedom of shape (e.g., producing curvilinear displays, irregular shaped displays), freedom to produce devices of both large and small sizes with substantial weight variations. The growth in portable electronic equipment such as portable computers and cellular phones has promoted studies on flexible substrates using a plastic in lieu of glass substrates, which are heavy, large in thickness, easily broken, and difficult to bend. Materials such as polyethylene terephthalate, polyethylene naphthalate, polycarbonate, polyimide, polyethylene sulfonate, polyoxymethylene, polyacrylate or a fiber reinforced plastic can be used for the various flexible substrates.

However, those plastic substrates have disadvantages. For example, their heat resistance, solvent resistance, gas permeability resistance and water vapor transfer resistance are inferior to those of glass substrates. Especially, when using the plastic material as a substrate for a display device, inferiority in the gas permeability resistance and moisture blocking property (hereinafter, referred to as 'gas barrier property') of plastic substrates can be an obstacle to its utilization.

One method of imparting gas barrier properties to the plastic substrate comprises coating a polyvinylalcohol-based resin layer on the plastic substrate. However, the gas barrier layer comprising the polyvinylalcohol-based resin layer has disadvantages. Although the gas barrier property is good in a low humidity atmosphere of 50% or lower relative humidity, the gas barrier property deteriorates at a humidity higher than 50% relative humidity. Additionally, polyacrylonitrile, polyvinylchloride can be used as a material for a gas barrier layer. However, these materials have problems such as difficult to handle, environmental issues associated with applying them to the plastic substrate and the like.

Another method of imparting gas barrier properties to the plastic substrate comprises coating a metal oxide on the plastic substrate. In this method, the gas barrier property of the resulting coated material remains the same at different humidities. However, other properties such as mechanical properties are deteriorated. For example, when the metal oxide layer is thick enough to provide the desired gas barrier property, the metal oxide layer cracks easily. Moreover, in the case of silicon oxide, which is used widely as the metal oxide layer, the gas barrier layer located in the outer most layer of the substrate and is easily eroded by an aqueous alkali or alkaline solution.

Another problem associated with the plastic substrate is that the thermal expansion coefficient of the plastic substrate is larger when compared to glass substrates. This large thermal expansion coefficient can lead to separation of the glass portion from the plastic portion of a composite glass-plastic substrate when there are large temperature changes.

Therefore, the development of a new shape flexible substrate, which is lightweight and flexible, and devoid of the problems listed above is desirable.

SUMMARY OF THE INVENTION

Disclosed herein is a flexible substrate for a display device, comprising a plastic layer that comprises a woven glass fiber, a metal film coated on one side surface of the plastic layer, and an overcoating layer formed on one side surface of the metal film, wherein the overcoating layer is on the side of the metal film opposite from the plastic layer. The flexible substrate is thin, and has a small thermal expansion coefficient, excellent flexibility, heat resistance, gas permeability resistance and moisture blocking property.

Also disclosed is a display device comprising the flexible substrate having the above characteristics.

Disclosed herein too is a flexible substrate for a display device, comprising a plastic layer that comprises a woven glass fiber, a metal film coated on one side surface or both opposing side surface of the plastic layer, and an overcoating layer formed on one side surface of the metal film, wherein the overcoating layer is on the side of the metal film opposite from the plastic layer.

BRIEF DESCRIPTION OF THE DRAWINGS

The aforementioned features and other advantages will be more clearly understood from the following detailed description taken in conjunction with the accompanying drawings, in which.

DETAILED DESCRIPTION OF THE INVENTION

Figure 1A:
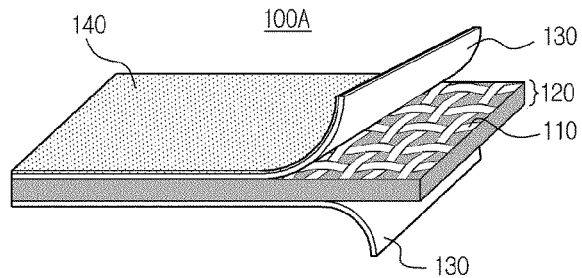
FIG. 1A is a perspective view illustrating the structure of a flexible substrate according to one embodiment.

The terminology used herein is for the purpose of describing particular embodiments only and is not intended to be limiting of the invention. The terms "a" and "an" do not denote a limitation of quantity, but rather denote the presence of at least one of the referenced item. The term "or" means "and/or". The terms "comprising", "having", "including", and "containing" are to be construed as open-ended terms (i.e., meaning "including, but not limited to").

Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Unless defined otherwise, technical and scientific terms used herein have the same meaning as is commonly understood by one of skill in the art to which this invention belongs.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. While the present invention has been particularly shown and described with reference to exemplary embodiments thereof, it will be understood by those of ordinary skill in the art that various changes in form and details may be made therein without departing from the spirit and scope of the present invention as defined by the following claims.

The present invention will now be described in greater detail with reference to the accompanying drawings.

A flexible substrate for a display device according to an embodiment of the present invention comprises a plastic layer comprising a woven glass fiber, a metal film coated on either one side surface or both opposing side surfaces of the plastic layer, and an overcoating layer formed on one side surface of the metal film wherein the overcoating layer is on the side of the metal film opposite from the plastic layer. The flexible substrate is thin and flexible and has an excellent gas barrier property.

The flexible substrate for a display device comprises a plastic layer that comprises a woven glass fiber such that the flexible substrate is thin and flexible and has a low thermal expansion coefficient.

FIG. 1A is a perspective view illustrating the structure of a flexible substrate. Referring to FIG. 1A, the flexible substrate 100A comprises a plastic layer 120 that comprises a woven glass fiber 110, a metal film 130 coated on either one surface or both opposing surfaces of the plastic layer 120, and an overcoating layer 140 coated on one surface of the metal film 130. The overcoating layer 140 is coated on the side of the metal layer opposite from the plastic layer 120.

The plastic layer 120 can be fabricated by disposing the woven glass fiber 110 into a plastic resin melt or a plastic resin solution, removing the impregnated woven glass fiber 100 from the melt of the solution and then drying the woven glass fiber 110.

The plastic layer 120 may comprise a wide variety of thermoplastic resins, blend of thermoplastic resins, thermosetting resins, or blends of thermoplastic resins with thermosetting resins. The plastic layer may also comprise a blend of polymers, copolymers, terpolymers, or combinations comprising at least one of the foregoing organic polymers. The plastic layer can also comprise an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at last one of the foregoing organic polymers.

Examples of the plastics for use in the plastic layer 120 are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, or the like, or a combination comprising at least one of the foregoing organic polymers.

Examples of thermosetting plastics suitable for use in the plastic layer 120 include epoxy resins, unsaturated polyester resins, polyurethane resins, polysiloxane resins, polyimide resins, bismaleimide resins, bismaleimide triazine resins, cyanate ester resins, vinyl resins, benzoxazine resins, benzocyclobutene resins, acrylics, alkyds, phenol-formaldehyde resins, novolacs, resoles, melamine-formaldehyde resins, urea-formaldehyde resins, hydroxymethylfurans, isocyanates, diallyl phthalate, triallyl cyanurate, triallyl isocyanurate, unsaturated polyesterimides, or the like, or a combination comprising at least one of the foregoing thermosetting resins.

Examples of blends of thermoplastic resins include acrylonitrile-butadiene-styrene/nylon, polycarbonate/acrylonitrile-butadiene-styrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, styrene-maleicanhydride/acrylonitrile-butadiene-styrene, polyether etherketone/polyethersulfone, polyether etherketone/polyetherimide polyethylene/nylon, polyethylene/polyacetal, or the like.

Exemplary plastics are polyethylene terephthalate, polyethylene naphthalate, polycarbonate, polyimide, polyethylene sulfonate, polyoxymethylene, a fiber reinforced plastic (FRP), or the like.

Because of the inclusion of the woven fiber into the plastic layer, the thermal coefficient expansion of the composite can be matched with that of the metal film 130 and the overcoat layer 140 thus eliminating any separation of the layer due to differences between the respective thermal coefficients of expansion. The thickness of the plastic layer 120 is about 10 to about 300 micrometers (μm), and specifically about 50 to about 200 (μm).

The plastic layer 120 can also be fabricated by laminating a plurality of layers of the prepreg containing the woven glass fiber. In one embodiment, the plastic layer 120 can also be fabricated by laminating two layers of prepreg containing the woven glass fiber 110.

In the flexible substrate 100A, examples of the material for the metal film 130 can comprise copper, aluminum, iron, tin, or the like, or a combination comprising at least one of the foregoing metals. The thickness of the metal film 130 is about 5 to about 300 μm, and specifically about 15 to about 150 μm.

Figure 1B:
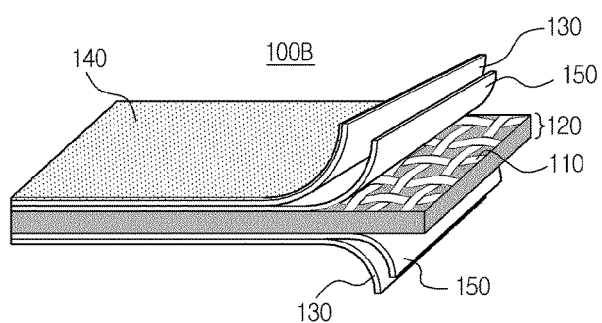
FIG. 1B is a perspective view illustrating the structure of a flexible substrate according to another embodiment.
Figure 1C:
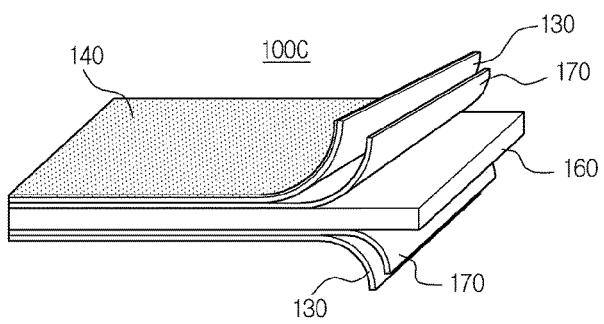
FIG. 1C is a perspective view illustrating the structure of a flexible substrate according to yet another embodiment.

As shown in the FIGS. 1a, 1b and 1c, the metal film 130 can be coated on either one side surface or both opposing side surfaces of the plastic layer 120. Exemplary methods for coating the metal film on the plastic layer include adhesion by using adhesives, sputtering, chemical vapor deposition (CVD), plasma enhanced chemical vapor deposition (PECVD), casting, lamination, organometallic vapor phase epitaxy (OMVPE), metal-organic chemical vapor deposition (MOCVD) and organometallic chemical vapor deposition (OMCVD), or the like, or a combination comprising at least one of the foregoing methods. FIG. 1B is a perspective view illustrating the structure of a flexible substrate according to another embodiment. Referring to FIG. 1B, the flexible substrate 100B may further comprise a polytetrafluoroethylene (PTFE) film layer 150 between the plastic layer 120 and the metal layer 130. Functions of the PTFE film layer include increasing the ductility and water resistance of the substrate.

FIG. 1C is a perspective view illustrating the structure of a flexible substrate according to yet another embodiment. Referring to FIG. 1C, the flexible substrate 100C may comprise a polyimide film layer 160 instead of the plastic layer 120 containing the woven glass fiber 110 to further increase, for example, the ductility of the substrate. Here, the thickness of the polyimide layer 160 is about 5 to about 200 μm, specifically about 10 to about 125 μm.

Furthermore, the flexible substrate 100C may further comprise a polytetrafluoroethylene (PTFE) film layer 170 between the polyimide film layer 160 and the metal film 130. The thickness of the polytetrafluoroethylene (PTFE) film layer 170 is about 10 to about 200 μm, specifically about 15 to about 120 μm.

In the flexible substrate, the overcoating layer 140 is formed on one side surface of the metal film 130. The overcoating layer is coated on the side surface opposite from the plastic layer. The overcoat layer can, for example, reduce unevenness of the substrate surface. Examples of the overcoating layer 140 include an oxide film or a nitride film, which is generally used in the fabrication of a semiconductor device.

Specific examples of the oxide or the nitride film include substances having a low permittivity selected from the group consisting of silicon oxycarbide (SiOC), silicon oxyfloride (SiOF), silica ($SiO_2$), silicon oxynitride (SiON), tetra-ethyl-ortho-silicate (TEOS), hydrogensilsesquioxane, methylsilsesquioxane (MSQ), bis-benzocyclobutene (BCB), poly arylene ether and hybrid-organo-siloxane polymer (HOSP). Methods for forming the overcoating layer 140 include methods for forming an oxide film in the process of fabricating a semiconductor, such as chemical vapor deposition (CVD) or a wet process. The wet process is preferable in the roll to roll process.

As a method for coating the overcoating layer 140 in the wet process, roll coating, spin coating, spray coating, dip coating, or the like, can be used. In order to further improve the gas barrier property in the overcoating layer 140, a metal substance may be introduced to the overcoat layer 140, which comprises, for example, the oxide film or the nitride film.

Specific examples of the metal substance include copper or aluminum. The metal substance may exist in the overcoating layer 140 in a form of aluminum oxide, copper oxide, or the like.

The thickness of the overcoating layer 140 is about 3 to about 50 μm, and specifically about 5 to about 15 μm.

The flexible substrate of the present invention has a remarkably improved the gas barrier property. In addition, the substrate has reduced unevenness of the substrate surface as a result of the overcoating layer 140 on the metal film 130.

Another aspect of the present invention relates to a display device comprising the flexible substrate according to the present invention.

Figure 2:
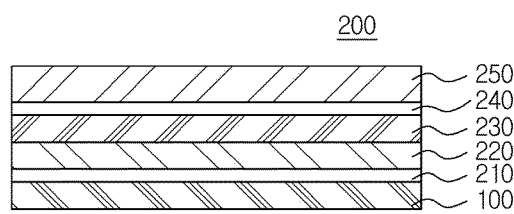
FIG. 2 is a simplified cross-sectional view illustrating a display device according to an embodiment.

FIG. 2 is a simplified cross-sectional view illustrating a display device according to an embodiment of the present invention. Referring to FIG. 2, the display device 200 comprises a flexible substrate 100, a reflective anode 210, a hole injection layer 220, an emissive layer 230, a cathode 240 and a sealing layer 250.

Examples of the display device 200 according to an embodiment of the present invention include a TV, a notebook computer, a cellular phone, an electronic paper, or the like. However, the present invention is not particularly limited thereto.

Hereinafter, the present invention will be explained in more detail with reference to the following examples. These examples are given for the purpose of illustration and are not to be construed as limiting the scope of the invention.

EXAMPLES

Example 1

Fabrication of Flexible Substrate Comprising Copper Film/Plastic Layer/Copper Film and Overcoating Layer 1) Preparation of Copper Clad Laminate First, a woven glass fiber with the thickness of about 0.9 μm was dipped in a prepreg hot melt solution at 200° C. to form a coated prepreg. Then the coated prepreg was baked at 200° C. to produce a prepreg containing the woven glass fiber. Subsequently, two layers of the coated prepreg were laminated and compressed at 150° C. to produce a plastic layer containing the woven glass fiber.

Next, on both surfaces of the plastic layer, a hot melt type polyimide varnish was coated, and a rolled copper having a thickness of about 18 μm was disposed upon the hot melt type polyimide varnish. The rolled copper was subjected to a surface smoothing treatment. The resulting layer was hot-pressed with the pressure of 150 kgf/cm² at 180° C. in a vacuum press to prepare a copper clad laminate with the thickness of about 150 μm.

2) Formation of Overcoating Layer

Subsequently, on one surface of the copper clad laminate, MSQ (methylsilsesquioxane) was roll coated, and the coated laminate was dried at 180° C. for 5 minutes to form an overcoating layer with a thickness of 5 μm.

Example 2

Fabrication of Flexible Substrate Comprising Copper Film/PTFE Film Layer/Plastic Layer/PTFE Film Layer/Copper Film and Overcoating Layer A flexible substrate was fabricated in the same manner as in Example 1, except that a PTFE film layer with a thickness of about 10 μm was further included between the plastic layer and the copper film as a constituting substance for the copper clad laminate.

Comparative Example 1

A flexible substrate was fabricated in the same manner as in Example 1, except that the overcoating layer was not formed on the copper clad laminate.

The water vapor transfer resistance ("WVTR", g/m² day) was measured on Example 1 and Comparative Example 1 using PERMATRAN-W Model 398 manufactured by MOCON, Inc.

WVTR of the flexible substrate for a display device of Example 1 according to the present invention showed the average of $10^{-2}$ by introducing the overcoating layer. Meanwhile, in the case of Comparative Example 1 where an overcoating layer was not formed, the WVTR was 5 to 8.

The results showed that the water vapor transfer resistance was improved by introducing the overcoating layer. The overcoating layer covered fine pinholes as well as reduced unevenness of the substrate surface.

Moreover the thermal expansion coefficient of the flexible substrate was 10 ppm/° C. at 200° C., which is similar to that of a copper film.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described in the above, the flexible substrate of the present invention comprises a plastic layer containing a woven glass fiber, a metal film coated on either both surfaces or one surface of the plastic layer, and an overcoating layer coated on one surface of the metal film that is opposite of the plastic layer. The flexible substrate is thin, has small thermal expansion coefficient, it also has excellent flexibility, heat resistance, and gas barrier property.

Moreover, the display device comprising the flexible substrate according to the present invention can be utilized as various display devices of electronic equipments such as a TV, a notebook computer, a cellular phone, and an electronic paper.

What is claimed is:

1. A flexible substrate for a display device comprising:
a plastic layer containing a woven glass fiber;
a metal film coated on substantially an entire portion of at least one of a first surface and a second surface, opposite the first surface, of the plastic layer; and
an overcoating layer coated on one side surface of the metal film,
wherein the one side surface is on a side of the metal film opposite from the plastic layer;
wherein the metal film comprises copper, aluminum, or a combination comprising at least one of the foregoing metals;
wherein the metal film has a thickness of about 5 to about 300 μm, and
wherein a thermal expansion coefficient of the woven glass fiber substantially matches those of the metal film and the overcoating layer.

2. The flexible substrate according to claim 1, wherein the plastic layer comprises: a thermoplastic polymer; a thermosetting polymer; a blend of thermoplastic polymers; or a blend of a thermoplastic polymer with a thermosetting polymer.

3. The flexible substrate according to claim 1, wherein the plastic layer comprises a material selected from the group consisting of polyethylene terephthalate, polyethylene naphthalate, polycarbonate, polyimide, polyethylene sulfonate, polyoxymethylene, polyacrylate, and a fiber reinforced plastic (FRP).

4. The flexible substrate according to claim 1, wherein the plastic layer comprises a laminated layer of two prepregs containing the woven glass fiber.

5. The flexible substrate according to claim 4, wherein the plastic layer has a thickness of about 10 to about 300 μm.

6. The flexible substrate according to claim 1, wherein the metal film is disposed onto the plastic layer using any one method comprising a non-adhesive method, a cast method or a lamination method.

7. The flexible substrate according to claim 1, further comprising a polytetrafluoroethylene film layer between the plastic layer and the metal film.

8. The flexible substrate according to claim 1, wherein the overcoating layer has a thickness of about 3 to about 50 μm.

9. The flexible substrate according to claim 1, wherein the overcoating layer is formed by any one method comprising roll coating, spin coating, spray coating or dip coating.

10. A display device comprising the flexible substrate according to claim 1.

11. The flexible substrate according to claim 1, wherein the thermal expansion coefficient of the woven glass fiber is substantially the same as those of the metal film and the overcoating layer.

* * * * *